(12) United States Patent  
Goto et al.

(10) Patent No.: US 9,296,192 B2  
(45) Date of Patent: Mar. 29, 2016

(54) PRODUCTION METHOD OF METALLIC DECORATIVE SHEET, AND PRODUCTION METHOD OF INSERT MOLDED BODY USING THE METALLIC DECORATIVE SHEET

(75) Inventors: Kaoru Goto, Aichi (JP); Seiji Hayashi, Aichi (JP); Tatsumi Takahashi, Aichi (JP); Kiyomi Matsuoka, Aichi (JP); Yoshihide Goto, Aichi (JP)

(73) Assignee: SANWA SCREEN CO., LTD., Aichi (JP)

( * ) Notice: Subject to any disclaimer, the term of this patent is extended or adjusted under 35 U.S.C. 154(b) by 742 days.

(21) Appl. No.: 13/212,563

(22) Filed: Aug. 18, 2011

(65) Prior Publication Data

US 2012/0048458 A1 Mar. 1, 2012

(30) Foreign Application Priority Data

Aug. 31, 2010 (JP) ................................. 2010-193333

(51) Int. Cl.
| | |
|---|---|
| *B29C 70/74* | (2006.01) |
| *B32B 38/14* | (2006.01) |
| *B29C 45/14* | (2006.01) |
| *C09D 11/16* | (2014.01) |
| *B32B 38/12* | (2006.01) |

(52) U.S. Cl.
CPC .............. *B32B 38/14* (2013.01); *B29C 45/1418* (2013.01); *B29C 45/14688* (2013.01); *B29C 45/14811* (2013.01); *B29C 2045/14696* (2013.01); *B29C 2045/14704* (2013.01); *B32B 38/12* (2013.01); *B32B 2451/00* (2013.01); *C09D 11/16* (2013.01); *Y10T 156/1074* (2015.01)

(58) Field of Classification Search
CPC ........... B29C 2045/14696; B29C 2045/14704; B29C 45/1418; B29C 45/14688; B29C 45/14811; C09D 11/16; B32B 2451/00; B32B 38/12; B32B 38/14; Y10T 156/1074; Y10T 156/10
USPC ........................................................ 156/245
See application file for complete search history.

(56) References Cited

FOREIGN PATENT DOCUMENTS

| | | |
|---|---|---|
| JP | 2005-285720 | 10/2005 |
| JP | 2009-006612 | 1/2009 |
| JP | 2009-006613 | 1/2009 |
| JP | 2009-066971 | 4/2009 |
| JP | 2009066971 A * | 4/2009 |

* cited by examiner

*Primary Examiner* — Philip Tucker
*Assistant Examiner* — Vicki Wu
(74) *Attorney, Agent, or Firm* — Kramer & Amado P.C.

(57) ABSTRACT

A production method of a metallic decorative sheet (10) which is insert-molded integrally with a thermoplastic resin molded body (20) to constitute an insert molded body (1) has steps of: laminating a specular ink layer (12) on one surface of a transparent thermoplastic resin film (11) in a region except an edge region serving as an edge portion of the insert molded body (1) and in a region for displaying a metallic design on an outer surface of the insert molded body (1), and laminating a non-specular ink layer (13) on the specular ink layer (12) and on the surface of the transparent thermoplastic resin film (11) where the specular ink layer (12) is not laminated.

8 Claims, 4 Drawing Sheets

PRIOR ART

PRODUCTION METHOD OF METALLIC DECORATIVE SHEET, AND PRODUCTION METHOD OF INSERT MOLDED BODY USING THE METALLIC DECORATIVE SHEET

This application claims priority to Japanese Patent Application No. JP2010-193333, filed Aug. 31, 2010, which is hereby incorporated by reference for all purposes as if fully set forth herein.

BACKGROUND OF THE INVENTION

1. Field of the Invention

The present invention relates to a production method of a metallic decorative sheet, and a production method of an insert molded body using the metallic decorative sheet.

2. Description of the Related Art

Conventionally, a molded body formed by coating a metallic decorative sheet (having a quality like metal) on a thermoplastic resin molded body has been known. The molded body is produced according to an insert molding by disposing preliminarily the metallic decorative sheet in a die and injecting thermoplastic resin into a cavity of the die for forming the thermoplastic resin molded body. The molded body is commonly used in a display portion, a touch panel or the like of home electric appliances.

The metallic decorative sheet is formed in such a way that a back surface thereof is printed with a design of words, graphics or the like in non-metallic ink, and the entire back surface except the design part is laminated by metal thin-film layers.

As a production method of the metallic decorative sheet, there has been known one, for example, as illustrated in FIG. 4, the production method comprises steps of: printing on one surface of a transparent thermoplastic resin film 111 a design 130 to be displayed on an outer surface of the molded body 100, vapor depositing thereon a metal thin-film layer 112, subsequently printing a non-specular ink layer 114 for preventing the metal thin-film layer 112 from being seen through, and finally printing a binder layer 115 for binding with a thermoplastic resin molded body 120 (for example, refer to Japanese Patent Laid-open No. 2005-288720).

There has also been known a method to compose the metal thin-film layer 112 of a specular ink layer through specular ink printing (for example, refer to Japanese Patent Laid-open No. 2009-6613).

However, in an edge region K of the insert molded body 1 as illustrated in FIG. 4, the metal thin-film layer 112 of the metallic decorative sheet 110 may have a contact with the thermoplastic resin molded body 120. However, it is difficult for the metal thin-film layer 112 to have a close contact with the thermoplastic resin molded body 120; in addition, if adhered by an alkaline solution such as a bleaching agent or the like, it is easy for the metal thin-film layer 112 to be dissolved (corroded) by the alkaline solution. Thereby, the metallic decorative sheet 110 would detach from the thermoplastic resin molded body 120 in the edge region K, which deteriorates the visual appearance of the product.

SUMMARY OF THE INVENTION

The present invention has been accomplished in view of the aforementioned problems, and it is therefore an object of the present invention to provide and a production method of an insert molded body and a production method of a metallic decorative sheet which is used in the production method capable of displaying on an outer surface of an insert molded body a metallic design and a non-metallic design as conventional, preventing the metallic decorative sheet from getting detached at an edge region.

To attain an object described above, the production method of a metallic decorative sheet according to the present invention is a production method of a metallic decorative sheet which is insert-molded integrally with a thermoplastic resin molded body to constitute an insert molded body. The production method of a metallic decorative sheet according to the present invention comprises steps of: laminating a specular ink layer on one surface of a transparent thermoplastic resin film in a region except an edge region serving as an edge portion of the insert molded body and in a region for displaying a metallic design on an outer surface of the insert molded body, and laminating a non-specular ink layer on the specular ink layer and on the surface of the transparent thermoplastic resin film where the specular ink layer is not laminated.

According to the production method of the metallic decorative sheet of the prevention invention, the specular ink layer is laminated on one surface of the transparent thermoplastic resin film. Therefore, on the surface of the transparent thermoplastic resin, there exist the specular ink layer and the portions where the specular ink layer is not laminated.

Thereafter, the non-specular ink layer is laminated on the specular ink layer and on the surface of the transparent thermoplastic resin film where the specular ink layer is not laminated. Accordingly, the non-specular ink layer is formed on the specular ink layer to prevent the specular ink layer from being seen through, and meanwhile, the non-specular ink layer is laminated on the surface of the thermoplastic resin film where the specular ink layer is not laminated. Thereby, it is not only possible to prevent the specular ink layer from being seen through but also possible to display a non-metallic design or the like on the outer surface of the insert molded body.

Further, in the edge region serving as an edge portion of the insert molded body, the specular ink layer is prevented from becoming exposed by the non-specular ink layer. Accordingly, the metallic decorative sheet can be prevented from getting detached at the edges of the insert molded body.

It is also possible to form a transparent window on the outer surface of the insert molded body as an aspect of the non-metallic design, by not laminating the non-specular ink layer on a part of the region for displaying the non-metallic design or the like.

The production method of an insert molded body according to the present invention is a production method for producing an insert molded body by insert molding the metallic decorative sheet produced according to the present invention integrally with a thermoplastic resin molded body. The production method of an insert molded body according to the present invention comprises steps of: laminating a binder layer on the metallic decorative sheet; performing a forming process on the metallic decorative sheet; performing a die-cut process on the metallic decorative sheet; and disposing the metallic decorative sheet, which has been laminated with the binder layer, performed with the forming process and performed with the die-cut process, in a die configured to form a cavity and injecting a thermoplastic resin into the cavity to form the thermoplastic resin molded body.

According to the production method of an insert molded body according to the present invention, the insert molded body is produced by using the metallic decorative sheet produced according to the production method of the metallic decorative sheet of the present invention.

Thereby, it is not only possible to prevent the specular ink layer from being seen through but also possible to display a metallic design and a non-metallic design or the like on the outer surface of the insert molded body. Further, in the edge region serving as an edge portion of the insert molded body, the specular ink layer is prevented from becoming exposed by the non-specular ink layer. Accordingly, the metallic decorative sheet can be prevented from getting detached at the edges of the insert molded body.

It is acceptable to perform the process of laminating the binder layer on the metallic decorative sheet, the process of forming the metallic decorative sheet and the process of die-cutting the metallic decorative sheet in a different order, for example, the forming process may be performed after the die-cut process.

DETAILED DESCRIPTION OF THE PREFERRED EMBODIMENTS

Figure 1:
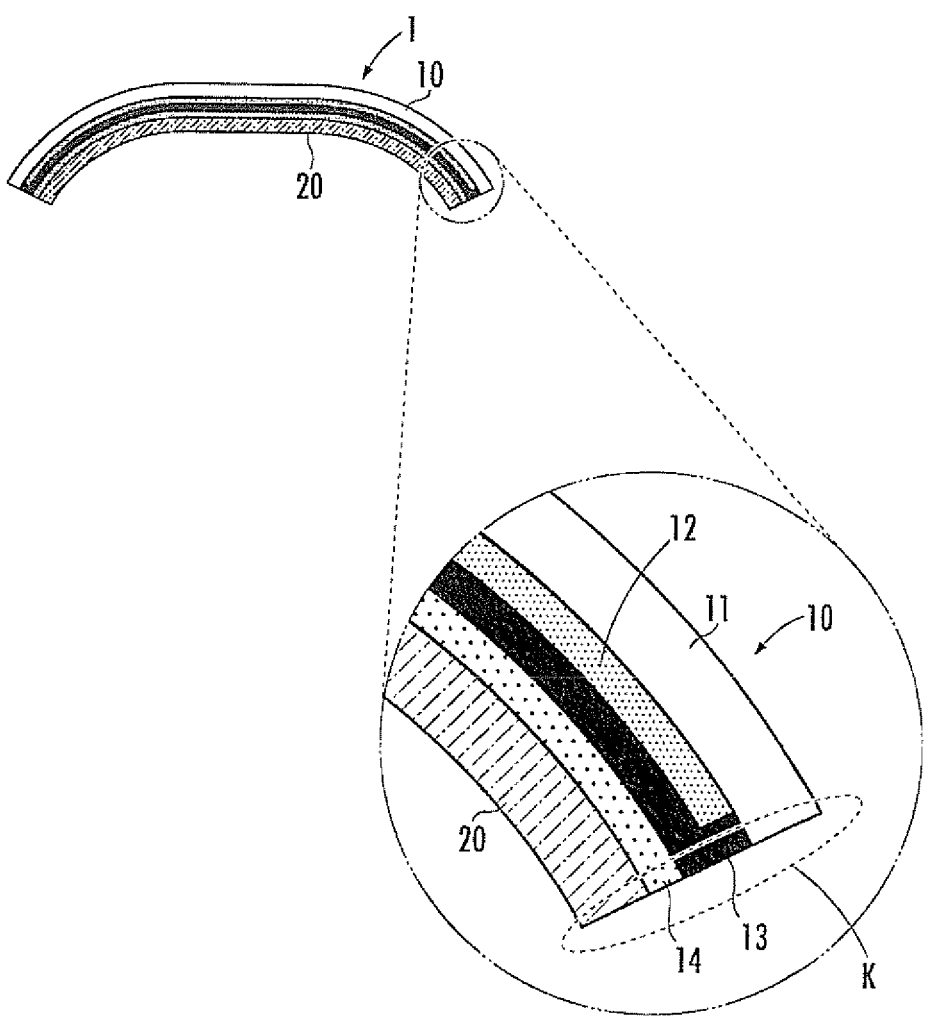
FIG. 1 is a cross-sectional view of an insert molded body produced according to a production method in an embodiment of the present invention and an enlarged view of an edge portion thereof.

As illustrated in FIG. 1, an insert molded body 1 according to an embodiment of the present invention is composed of a metallic decorative sheet 10 and a thermoplastic resin molded body 20. The metallic decorative sheet 10 has a laminated structure formed by laminating sequentially a specular ink layer 12, a non-specular ink layer 13 and a binder layer 14 on a side of a surface of a transparent thermoplastic resin film 11 which will be in contact with the thermoplastic resin molded body 20. The transparent thermoplastic resin film 11 is used as a base plate in the present embodiment.

Hereinafter, with reference to FIG. 2 and FIG. 3, a production method of the insert molded body 1 of the present embodiment will be described.

Figure 2:
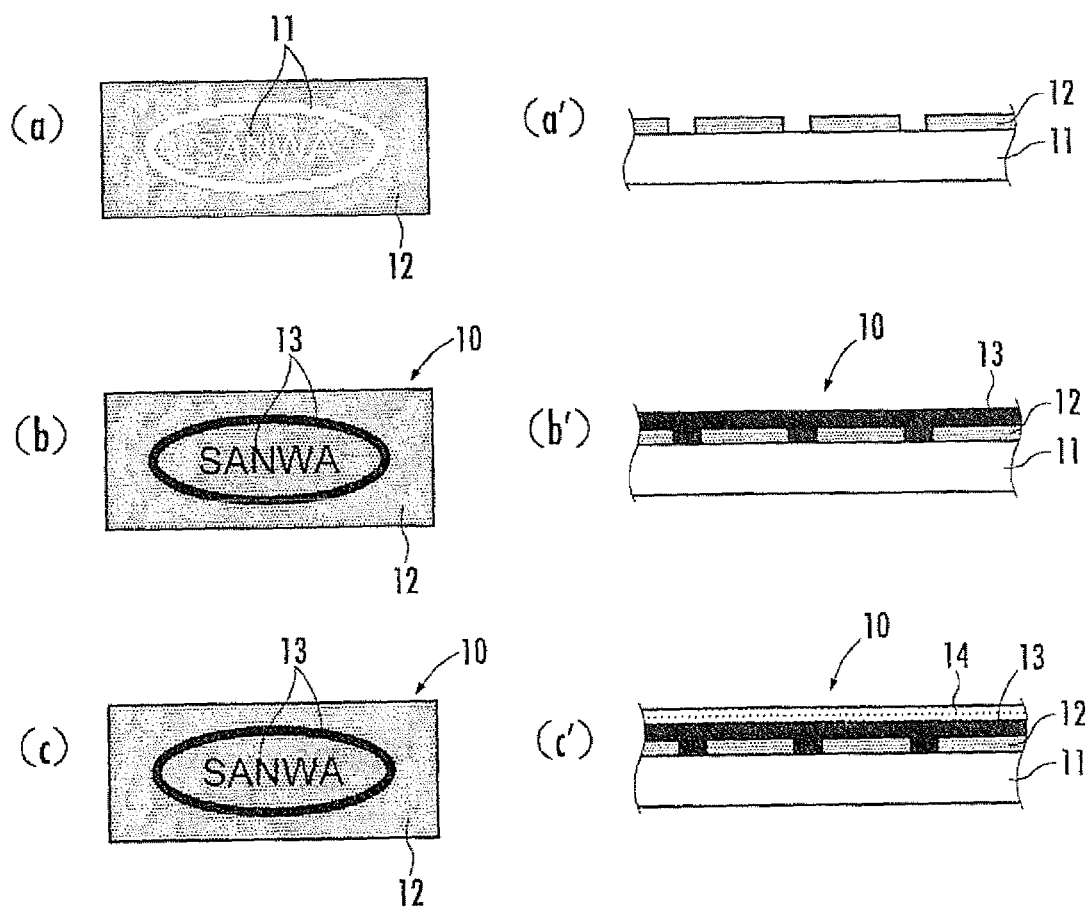
FIG. 2 illustrates plain views and cross-sectional partial views, respectively, for each production step.

As a first step illustrated by FIG. 2(a) and FIG. 2(a'), the specular ink layer 12 is formed on the surface of the transparent thermoplastic resin film 11 facing the thermoplastic resin molded body 20, namely the back surface thereof. FIG. 2(a') to FIG. 3(b') illustrate cross-sectional partial views of appropriate portions in FIG. 2(a) to FIG. 3(b), respectively.

The thermoplastic resin film 11 is composed of Polyethylene Terephthalate resin (PET), Polymethyl Methacrylate resin (PMMA), Polycarbonate (PC), ABS resin and the like.

The specular ink layer 12 is formed by printing or coating specular ink on the back surface of the thermoplastic resin film 11. The specular ink is an ink which contains fine pieces of metal thin-films such as aluminum, gold, silver, copper, brass, titanium, chromium, nickel, nickel chrome, stainless steel and the like, a resin binder and a solvent. The specular ink is also called as mirror ink. In a ease where the specular ink layer 12 is formed by printing, screen-printing is commonly applied. However, it is also acceptable to form the specular ink layer 12 by the other printing approaches.

With reference to FIG. 1, the specular ink layer 12 is formed in a region for displaying a metallic design on the outer surface of the insert molded body 1 as the finished product. However, in an edge region K serving as edge region of the insert molded body I, the specular ink layer 12 is not formed. In addition, it is acceptable to form a protection layer on the specular ink layer 12.

As a second step illustrated by FIG. 2(b) and FIG. 2(b'), the non-specular ink layer 13 is laminated on the specular ink layer 12 and on the back surface of the thermoplastic resin film 11 by printing non-specular ink on the back surface of the thermoplastic resin film 11. The non-specular ink layer 13 is formed by a common printing approach such as screen-printing, offset-printing or the like.

The non-specular ink is a sort of ink excluding the specular ink. As the non-specular ink, organic ink containing no metal components, for example, 2-pack urethane curing ink or polyester ink if the thermoplastic resin film 11 is made of PET, or polyester ink if the thermoplastic resin film 11 is made of PC, may be used.

It is also acceptable to use metallic ink containing metal flakes such as silver, copper, aluminum, bronze and the like as the non-specular ink. For example, if the non-specular ink layer 13 in the edge region K is formed by using the metallic ink such as silver ink or the like having gross, color and the like similar to the specular ink, then the boundary between the specular ink layer 12 and the non-specular ink layer 13 near the edge region K may become unnoticeable. In addition, the metallic ink has advantages over the specular ink in that it has excellent adhesion to resins and it has anti-corrosion against alkaline solutions.

In the case of differentiating the color of ink for displaying a non-metallic design of words, graphics or the like on the outer surface of the insert molded body 1 and a design on the edge region K from the color of ink for preventing the specular ink layer 12 from being seen through, it is acceptable that the non-metallic ink for printing the non-metallic design to be displayed on the outer surface of the insert molded body 1 and the design to be displayed on the edge region K is firstly printed on the thermoplastic resin film 11, and thereafter, the non-specular ink for preventing the specular ink layer 12 from being seen through is printed through the entire screen-printing.

Further, by not printing the non-specular ink layer 13 on a partial portion of the region to be displayed with the non-metallic design, it is possible to form the partial portion into a transparent window serving as one aspect of the non-metallic design.

The production of the metallic decorative sheet 10 is accomplished as described above.

Hereinafter, the pre-treatment of the metallic decorative sheet 10 to perform the insert molding will be described.

First, as a third step illustrated by FIG. 2(c) and FIG. 2(c') the binder layer 14 is laminated by screen-printing a binder on the non-specular ink layer 13. The binder may be selected appropriately from acryl resin, urethane resin, polyester resin, vinyl chloride resin or the like according to the type of the thermoplastic resin molded body 20.

When a plurality of the metallic decorative sheets 10 are produced as one piece of film, the one piece of film is roughly cut into a plurality of separated metallic decorative sheets 10 according to a necessary size range prior to the third step.

Figure 3:
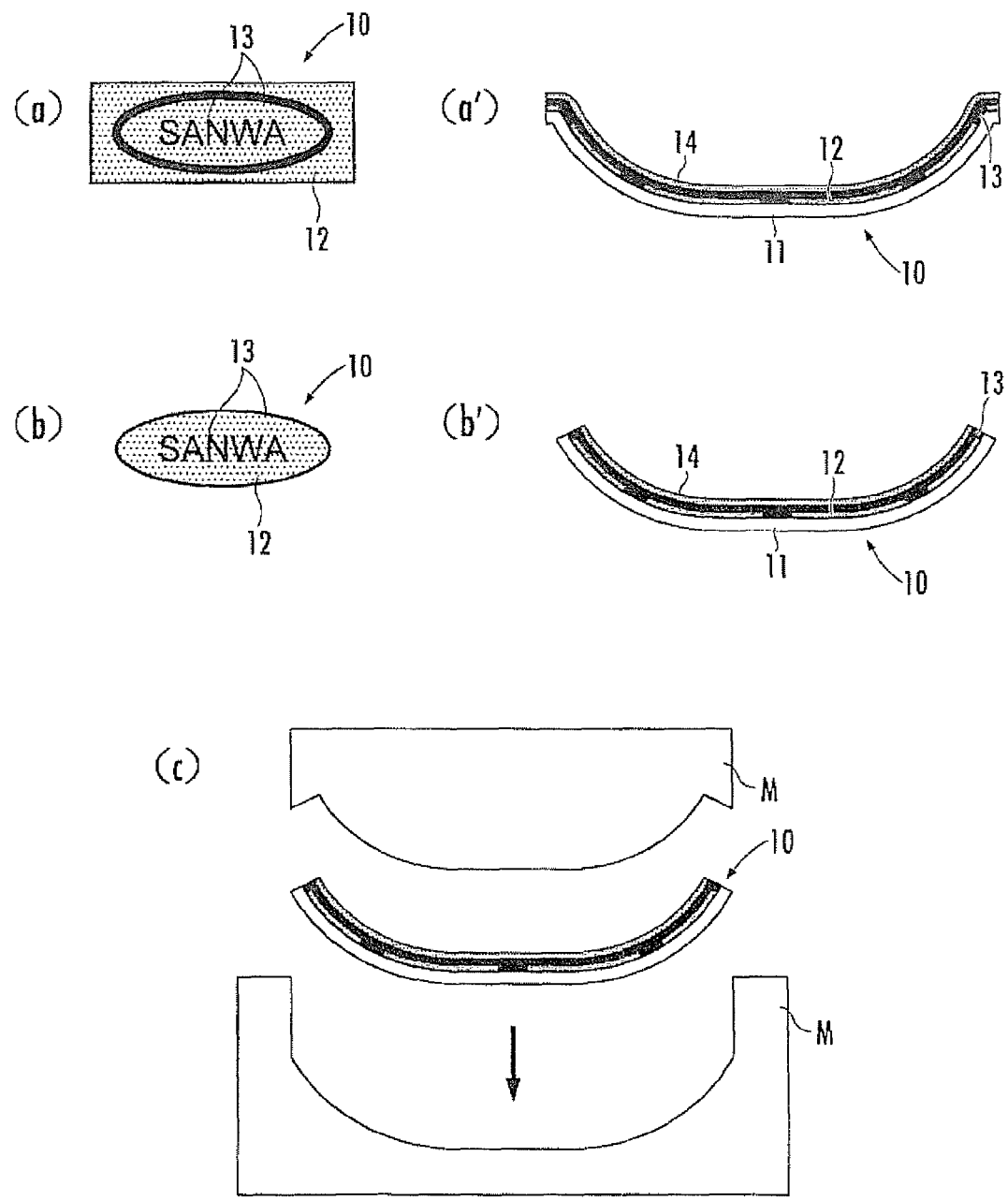
FIG. 3 illustrates plain views and cross-sectional partial views, respectively, for each production step performed after FIG. 2.
Figure 4:
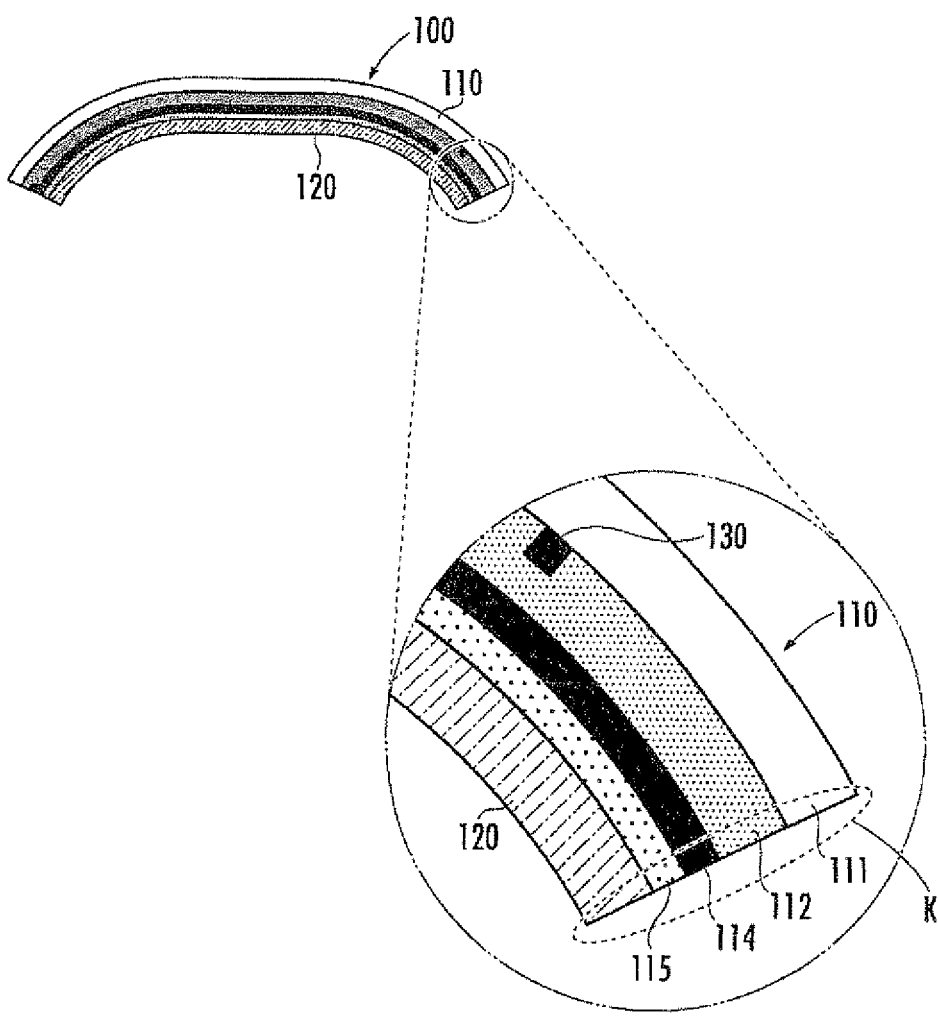
FIG. 4 is a cross-sectional view of an insert molded body produced according to a production method of a conventional art and an enlarged view of an edge portion thereof.

As a fourth step illustrated by FIG. 3(a) and FIG. 3(a'), a forming process such as air-pressure forming, hot pressing or the like is performed on the metallic decorative sheet 10. The forming process is performed on a surface of the metallic decorative sheet 10 opposite to the thermoplastic resin molded body 20 so that the surface bends along the outer periphery of the thermoplastic resin molded body 20. If the thermoplastic resin molded body 20 has a 3 dimensional shape, the forming process is performed to form the metallic decorative sheet 10 into the corresponding 3 dimensional shape.

As a fifth step illustrated by FIG. 3(b) and FIG. 3(b'), a die-cut process is performed on the metallic decorative sheet 10 after the forming process in accordance with the shape of the insert molded body 1. According to the die-cut process, the non-specular ink layer 13 is positioned at the edge portion of the metallic decorative sheet 10 to prevent the specular ink layer 12 from being exposed.

In the above, the production method is described to have been performed in an order of the third step, the fourth step and the fifth step; however, the order may be altered appropriately.

Finally, as a sixth step illustrated by FIG. 3(c), the insert molded body 1 is produced by using a die M.

The metallic decorative sheet 10 after the die-cut process is disposed in the die M capable of forming a cavity in such a way that the binder layer 14 faces the side of the cavity. Thereafter, thermoplastic resin is injected into the cavity to form the thermoplastic resin molded body 20. Thereby, the insert molded body 1 illustrated in FIG. 1 is obtained.

According to the production method of the insert molded body 1 described in the above, the non-specular ink layer 13 is formed on the specular ink layer 12 laminated on the transparent thermoplastic resin film 11, which makes it possible to prevent the specular ink layer 12 from being seen through.

Further, in the region for displaying the non-metallic design or the like on the outer surface of the insert molded body 1, the non-specular ink layer 13 is formed on the transparent thermoplastic resin film 11. Thereby, when viewed from the outer surface of the insert molded body 1, the non-specular ink layer 13 can be displayed on the outer surface through the transparent thermoplastic resin film 11; consequently, the non-metallic design or the like can be displayed clearly.

As illustrated in FIG. 3(b), since the metallic decorative sheet 10 has been cut along the edge region K, while the non-specular ink layer 13 is exposed, the specular ink layer 12 is not exposed in the edge region K. Therefore, in the case of producing the insert molded body 1 by using the metallic decorative sheet 10 treated by the die-cut process, the specular ink layer 12 of the metallic decorative sheet 10 is not exposed in the edge region K.

Furthermore, since the non-specular ink layer 13 is formed in the edge region K which is the edge portion of the insert molded body 1, the metallic decorative sheet 10 can be prevented from getting detached in the edge region K.

As described in the above, according to the production method of the insert molded body 1 of the present embodiment, by printing the non-specular ink for one time in the second step, the production method of the present invention can attain such effects as preventing the specular ink layer 12 from being seen through, displaying the non-metallic design or the like on the outer surface of the insert molded body 1, and preventing the metallic decorative sheet 10 from getting detached in the edge region K.

The prevention effect of the detachment of the metallic decorative sheet 10 from the insert molded body 1 produced by the production method of the present embodiment in the edge region K has been tested. Specifically, the insert molded body 1 was dipped in chlorine bleach mixed with sodium hydroxide for 24 hrs at room temperature; thereafter, whether or not the metallic decorative sheet 10 detaches in the edge region K was inspected. The result thereof is shown in Table 1.

TABLE 1

|  | Number of tests | Number of NG |
| --- | --- | --- |
| Conventional insert molded body | 5 | 5 |
| Insert molded body of present embodiment | 5 | 0 |

As shown in Table 1, in all of the 5 experiments conducted on the conventional insert molded body, the metallic decorative sheet 10 detached in the edge region K. In contrast, in all of the 5 experiments conducted on the insert molded body 1 of the present embodiment, the metallic decorative sheet 10 did not detach in the edge region K.

As observed from the experiment result, it is obvious that the metallic decorative sheet 10 can be prevented from getting detached from the insert molded body 1 produced by the production method of the present embodiment in the edge region K.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be affected while remaining within the spirit and scope of the invention. Accordingly, the foregoing disclosure, description, and figures are for illustrative purposes only and do not in any way limit the invention, which is defined only by the claims.

What is claimed is:

1. A production method of a metallic decorative sheet which is insert-molded integrally with a thermoplastic resin molded body to constitute an insert molded body, comprising:
    laminating a specular ink layer on one surface of a transparent thermoplastic resin film in a region for displaying a metallic design except an edge region along a whole circumference of a portion to be an edge portion of the insert molded body, except a region for displaying a non-metallic design, on an outer surface of the insert molded body; and
    laminating a non-specular ink layer on the specular ink layer and on the surface of the transparent thermoplastic resin film where the specular ink layer is not laminated.

2. The production method of claim 1, further comprising:
    performing a die-cut process on the metallic decorative sheet after the laminating steps.

3. The production method of claim 1, further comprising:
    positioning the non-specular ink layer at the edge portion of the metallic decorative sheet.

4. The production method of claim 1, wherein the back surface of the transparent thermoplastic resin film faces the thermoplastic resin molded body.

5. The production method of claim 1, wherein a specular ink for the specular ink layer contains fine pieces of metal thin-films.

6. The production method of claim 1, wherein a non-specular ink for the non-specular ink layer contains no metal components.

7. The production method of claim 1, wherein a non-specular ink for the non-specular ink layer is a metallic ink.

8. The production method of claim 1, further comprising:
    laminating a binder layer on the non-specular ink layer.

* * * * *